April 1, 1952     J. F. ROLLINS ET AL     2,591,010
DISTILLATION COLUMN
Filed Nov. 10, 1950
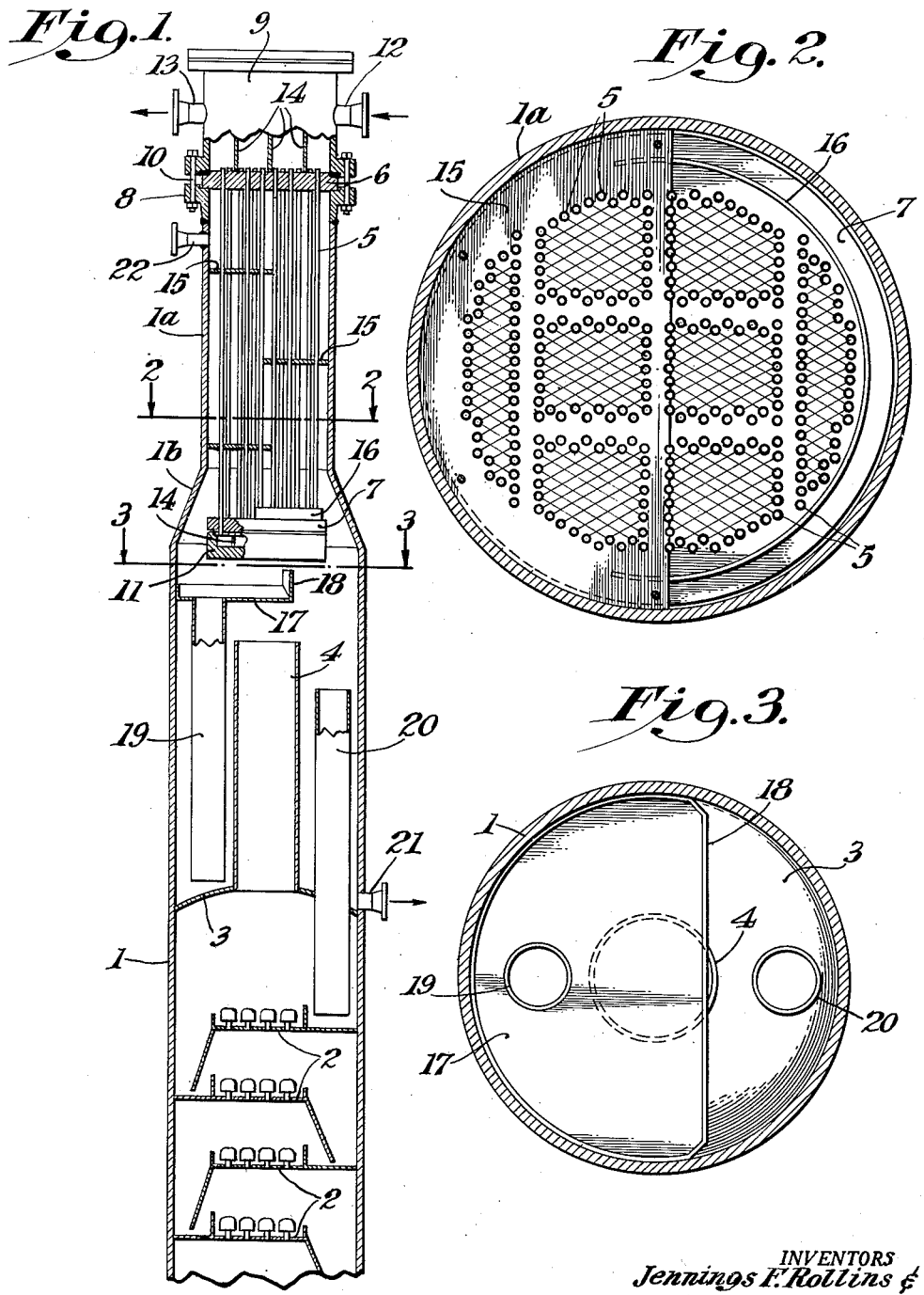
INVENTORS
Jennings F. Rollins &
Maurice E. Brooks
BY Nathaniel Ely
ATTORNEY Patented Apr. 1, 1952

2,591,010

UNITED STATES PATENT OFFICE 2,591,010

DISTILLATION COLUMN

Jennings F. Rollins, Westfield, N. J., and Maurice E. Brooks, Elmhurst, N. Y., assignors to The Lummus Company, New York, N. Y., a corporation of Delaware Application November 10, 1950, Serial No. 194,968

5 Claims. (Cl. 202—161)

This invention relates to improvements in a distillation column of a type having within the upper portion thereof apparatus for condensing the ascending vapors. More particularly, the invention is concerned with improvements in the condensing apparatus and the means for handling the condensate.

Important objects of the invention are, to provide for such a distillation column an improved combination of condenser means and condensate handling means devised to prevent entrainment of the condensate by the vapors rising to the condensing zone within the column; to provide such a combination which will cause the rising vapors enroute to the condensing zone to by-pass the condensate falling from said zone; to provide an improved correlation of the condensing means, the condensate handling means and other features of the tower; and to provide simple and economical structure for obtaining the desired results.

Other objects of the invention will appear from the following description taken with the accompanying drawing.

In the drawing:

Fig. 1 is a vertical sectional view of a distillation column embodying the invention.

Fig. 2 is an enlarged horizontal section on the line 2—2 of Fig. 1.

Fig. 3 is a horizontal section on the line 3—3 of Fig. 1, upon a scale intermediate the scales of Figs. 1 and 2.

As shown in Fig. 1 the invention is embodied in a distillation column or tower whose body portion 1 contains vapor-liquid contact devices. In the present disclosure, said devices are bubble decks 2 but they may be shower decks or devices of any other suitable type. The upper portion 1a of the column is of substantially less diameter than the body 1 and is connected to the latter by a tapered portion 1b. A dome-like partition 3 above the topmost bubble deck separates the vapor-liquid contact zone within the column from a condensate settling zone, and a central riser conduit or chimney 4 extends upwardly from said partition and through the settling zone to deliver the vapors to a condensing zone within the portions 1a and 1b of the column.

The apparatus for condensing the vapors delivered by the chimney 4 includes a bundle of vertical tubes 5 connected to upper and lower tube sheets 6 and 7, respectively. The upper tube sheet rests upon the top of the column which has a flange 8. A flanged channel structure 9 bears upon the upper side of the said tube sheet and is secured to the column flange 8 by bolts 10. The lower tube sheet 7, together with a recessed member, 11, forms a floating head suspended by the tubes. The channel 9 has inlet and outlet nozzles 12 and 13 for water or other cooling fluid and the channel 9 and floating head 11 have pass partition 14 in a number and arrangement required to circulate the cooling fluid through the tubes in a desired number of passes. Transverse baffles 15 affixed to the tube bundle in staggered arrangement serve to direct the rising vapors from side to side along the bundle. The reduced upper portion 1a of the column closely surrounds the tube bundle and forms the condenser shell.

An important feature of the invention is the provision for preventing entrainment, by the rising vapors, of condensate falling from the condensing zone. For that purpose, the lower tube sheet or plate 7 is provided with a curb 16 upstanding from the upper surface thereof and welded to or formed with the tube sheet. This curb is arcuate and it extends more than halfway around the lower portion of the tube bundle. Condensate from all of the tubes of the bundle drains upon the upper surface of the tube sheet and is constrained by the curb to flow from only the opposite, uncurbed side of the tube sheet. Beneath the floating head of the bundle there is a condensate collecting tray 17 of segmental form. This tray is welded around the curved side thereof to one side of the column and the straight side of the tray is substantially spaced from the opposite side of the column and has a weir 18. The tray is in position to catch the condensate which flows from the tube sheet 7.

A downpipe 19 extends from the tray 17 almost to the partition 3 of the column, and an overflow pipe 20 extends from a high level above the partition 3, but below the upper end of the chimney 4, downwardly through the partition 3 to a point just above the topmost bubble deck 2 and behind a weir thereon. Just above the partition 3 the column has a drain nozzle 21 for the settling zone.

In the operation of the column the vapors rise from the vapor liquid contact zone beneath the partition 3 and are delivered through the chimney 4 to a point above the settling zone and spaced beneath the condensate-collecting tray 17. The tray blocks flow of the vapors to the condensate falling from the tube sheet 7, and the tray and the floating head of the tube bundle are correlated with the column to afford liberal space for the vapor to flow past the weir 18 of the tray and the curbed side of the tube sheet 7 to the condensing tubes 5. Thus the rising vapors are led along a course which by-passes the condensate spill from the tube sheet 7 to the tray. Entrainment of the falling condensate by the vapors is thereby avoided. Vapors or other gaseous media which are not condensed upon the tubes are discharged from the condensing zone through a nozzle 22 which leads from a point near the upper end of the column and may be connected to an exhaust line, not shown.

The condensate caught by the tray 17 discharges through the down-pipe 19 and fills the annular settling space around the vapor chimney 4 to the level of the upper end of the overflow pipe 20 and the overflow into the pipe is delivered thereby as reflux to the topmost bubble deck where a liquid seal is formed behind the weir to exclude vapors from the pipe. Within the annular settling space water or other heavy component of the condensate settles and may be withdrawn through the nozzle 21 which may have a drain line, not shown, connected to it.

It will be seen that the invention provides a distillation column with improved features and a correlation thereof devised to contribute substantially to efficient performance of the column. The improvements involve a minimum of structural complication and equipment cost. For instance, in the condensing equipment, the condenser shell is formed by a portion of the column which is integral with the body of the column, and the other parts are designed for inexpensive manufacture and ready installation. Servicing of the condenser is also facilitated since the design and mounting of the tube bundle are such as to enable withdrawal of the bundle through the upper end of the column.

It is of course to be understood that the present disclosure of the invention is merely illustrative and in nowise limiting and that the invention comprehends such modifications as will fall within the scope of the following claims.

We claim:

1. In a distillation column, apparatus for condensing vapors rising within the column, comprising a bundle of vertical condenser tubes within the upper portion of the column and including a tube sheet at the lower end of the tubes, channel means for circulating cooling fluid through said tubes, said tube sheet having an upper surface to receive the condensate from the tubes, a curb projecting upwardly from said surface and extending around the lower portion of the tube bundle, said curb being open at one side only of the tube sheet for discharge of the condensate from said surface, and a condensate collecting tray within the column below said tube sheet and in position to catch said discharge, said tray and said tube sheet being correlated with the column to afford space therein for ascent of the vapors to the tubes past the tray and the opposite side of the tube sheet and thereby enable the vapors to by-pass the condensate falling from said surface to the tray and thus prevent entrainment of the condensate.

2. In a distillation column the combination as claimed in claim 1 wherein the upper portion of the column is of reduced cross section and forms a condenser shell closely surrounding the tube bundle.

3. In a distillation column, the combination as claimed in claim 1 wherein the upper portion of the column is of reduced cross section and forms a condenser shell closely surrounding the tube bundle, and the bundle and the said tube sheet with its condensate receiving surface and curb form a unit releasably mounted for upward withdrawal from the column.

4. In a distillation column, apparatus for condensing vapors rising within the column, comprising a bundle of substantially vertical tubes, channel means for circulating cooling fluid through said tubes, condensate collecting means attached to the tube bundle forming a collecting surface at the lower end of the bundle to catch the condensate falling from the tubes of the bundle, a curb projecting upwardly from said collecting surface and extending around the outer margin thereof, said curb being open at one side only of the collecting surface for discharge of the condensate from said surface, and a condensate collecting tray within the column beneath said collecting surface and disposed to catch said discharge therefrom, said tray and said collecting means being correlated with the column to afford space therein for ascent of the vapors to the tubes past the opposite side of said collecting surface and thereby enable the vapors to by-pass the condensate falling from said surface to the tray and thus prevent entrainment of the condensate.

5. In a distillation column the combination claimed in claim 4, wherein the upper portion of the column is of reduced cross section and forms a condenser shell closely surrounding the tube bundle, and the bundle and the said means forming said condensate-collecting surface and said curb form a unit releasably mounted for upward withdrawal from the column.

JENNINGS F. ROLLINS.
MAURICE E. BROOKS.

REFERENCES CITED

The following references are of record in the file of this patent:

UNITED STATES PATENTS

| Number | Name | Date |
|---|---|---|
| 92,941 | Dean | July 27, 1869 |
| 1,599,825 | Lewis | Sept. 14, 1926 |
| 1,985,068 | Weber | Dec. 18, 1934 |
| 2,254,538 | Newman | Sept. 2, 1941 |

FOREIGN PATENTS

| Number | Country | Date |
|---|---|---|
| 470,434 | Great Britain | Aug. 16, 1937 |